US008489443B2

(12) United States Patent
Megiddo (10) Patent No.: US 8,489,443 B2
(45) Date of Patent: Jul. 16, 2013

(54) METHOD AND APPARATUS FOR COLLABORATIVE SELECTION OF PROPOSALS (75) Inventor: Nimrod Megiddo, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 1268 days.

(21) Appl. No.: 12/051,783

(22) Filed: Mar. 19, 2008

(65) Prior Publication Data
US 2009/0240772 A1 Sep. 24, 2009

(51) Int. Cl.
*G06Q 10/00* (2012.01)
(52) U.S. Cl.
USPC ........... 705/7.23; 705/7.29; 705/37; 707/713; 707/731; 707/999.002
(58) Field of Classification Search
None
See application file for complete search history.

(56) References Cited

U.S. PATENT DOCUMENTS

| 7,043,450 | B2* | 5/2006 | Velez et al. ..................... 705/37 |
|---|---|---|---|
| 7,200,570 | B1* | 4/2007 | Wu .................................... 705/37 |
| 7,805,441 | B2* | 9/2010 | Madhavan et al. ............ 707/728 |
| 7,974,912 | B2* | 7/2011 | Velez et al. ..................... 705/37 |
| 2001/0032172 | A1* | 10/2001 | Moulinet et al. ................ 705/37 |
| 2002/0038285 | A1* | 3/2002 | Golden et al. .................. 705/38 |
| 2002/0082882 | A1* | 6/2002 | Perry et al. ........................ 705/7 |
| 2002/0174054 | A1* | 11/2002 | Grey et al. ...................... 705/37 |
| 2003/0023540 | A2* | 1/2003 | Johnson et al. ................. 705/37 |
| 2003/0088525 | A1* | 5/2003 | Velez et al. ..................... 705/400 |
| 2003/0110067 | A1* | 6/2003 | Miller et al. ....................... 705/8 |
| 2004/0167677 | A1* | 8/2004 | Weiss ............................. 700/291 |
| 2006/0020939 | A1* | 1/2006 | Fellenstein et al. .............. 718/1 |
| 2006/0149658 | A1* | 7/2006 | Smith ............................. 705/37 |
| 2006/0206352 | A1* | 9/2006 | Pulianda ........................... 705/1 |
| 2007/0016514 | A1* | 1/2007 | Al-Abdulqader et al. ...... 705/37 |
| 2007/0208706 | A1* | 9/2007 | Madhavan et al. ............... 707/3 |
| 2007/0208724 | A1* | 9/2007 | Madhavan et al. ............... 707/4 |
| 2009/0037316 | A1* | 2/2009 | Zhou ............................... 705/37 |

FOREIGN PATENT DOCUMENTS

| EP | 1146461 A2 | 10/2001 |
|---|---|---|
| JP | 2001350958 A | 12/2001 |
| JP | 2002197303 A | 7/2002 |

OTHER PUBLICATIONS

Laine S. et al., "Spitzer Space Telescope proposal process", in Observatory Operations: Strategies, Processes, and Systems, edited by David R. Silva, Rodger E. Doxsey, Proc. of SPIE vol. 6270 627029-1.

* cited by examiner

*Primary Examiner* — Gurkanwaljit Singh
(74) *Attorney, Agent, or Firm* — Shimokaji & Assoc., PC (57) ABSTRACT A method and apparatus for selecting a subset of proposals from a set of proposals submitted via a web site, including defining proposal attributes for the selecting, formulating selection requirements for the subset, establishing metrics for comparing proposals according to the proposal attributes and the selection requirements, evaluating each of the set of proposals according the established metrics, distributing the results of evaluating each of the set of proposals to the submitter of each proposal, formulating an optimization problem for determining the subset of proposals, determining the subset of proposals by solving the optimization problem, and accepting feedback about the determining including changing the optimization problem based on the feedback.

20 Claims, 7 Drawing Sheets

Proposal Attributes

Numerical Attributes

| | | |
|---|---|---|
| Number of Person-Years | 12 | — 52 |
| Invesment Required | $100K-$1M ▼ | — 54 |
| Project Duration (months) | 6-12 ▼ | — 56 |
| Expected Revenue | $5M-$10M ▼ | — 58 |

Categorical Attributes

| | | |
|---|---|---|
| Technical Area | Software | — 60 |
| Existing Competition | ✓ | — 62 |
| Geographic Area | ● North America<br>○ Europe<br>○ Japan | — 64 |
| Skills Required | Developer ▼ | — 66 |
| Long-Term Value | ✓ | — 68 |

METHOD AND APPARATUS FOR COLLABORATIVE SELECTION OF PROPOSALS

BACKGROUND OF THE INVENTION

The present invention relates generally to the field of selection of proposals, and more specifically, to the collaborative selection of proposals.

Organizations often plan their future activities by funding a set of projects. The set of funded projects is constructed by selection from a set of proposals, ideas, suggestions, opportunities, etc., based on some criteria. Although the final decision may be made by a single authority, the selection process typically involves multiple parties. The involvement of multiple parties is important both for formulating the criteria and for actually evaluating the proposals. The problem though is that members of the selection team may be based in many different locations.

Travel is expensive, time consuming, and disruptive, especially when it is international. There is a limited amount of time and money that members can allocate for travel to proposal selection meetings. Teleconferences can substitute for travel, but there is a limit as to how long they can last.

In a meeting or teleconference, proposals are typically considered one at a time. If the organization wishes to select an optimal subset, it has to consider combinations of proposals. Ideally, an organization wishes to identify a best combination that satisfies some prescribed requirements. The problem is that the number of possible combinations grows exponentially with the number of proposals.

US Patent Application Publication 20020082882A1 to Perry et al. (hereafter "Perry") discloses a method for evaluating a business proposal, and a computerized system for evaluating and pricing the proposal. An evaluation for a service is generated by gathering information on the customer, the service-provider's cost experience in providing service to this and other customers, and the estimated cost of providing this particular service. The method may also be used to calculate the benefit to the provider of providing and to the customer of receiving a particular service.

However, Perry does not disclose a method that facilitates the finding a subset of proposals that is best possible with respect to criteria formulated collaboratively, without the need for very long meetings or teleconferences.

US Patent Application Publication 20010032171A1 to Moulinet et al. (hereafter "Moulinet") discloses that requesting a proposal and awarding a contract for provision of services is implemented by a local computing system, a remote computing system, and a service provider system. Proposal parameters and a service area requirement that define a request for proposal (RFP) are used to screen a list of service providers. A short list of service providers is defined based on the service providers' qualifications. Using a single action, an RFP is simultaneously submitted to the service providers on the short list. A service provider retrieves from the remote computing system stored content for use in preparing a response to the RFP. The service provider system submits the response to the requesting party via the remote computing system. RFPs and responses thereto are tracked, with the status of the RFPs and responses being reported using various indicators. A contract for the provision of services is awarded to a winning service provider.

However, Moulinet does not disclose a method that facilitates finding a subset of proposals that is best possible with respect to criteria formulated collaboratively, without the need for very long meetings or teleconferences.

Therefore, there is a need for a method that facilitates the finding a subset of proposals that is best possible with respect to criteria formulated collaboratively, without the need for very long meetings or teleconferences.

SUMMARY OF THE INVENTION

In one aspect, the present invention comprises a method of collaboratively selecting a subset of proposals from a set of proposals submitted via a web site by solving an optimization problem based on collaboratively selected proposal attributes, requirements, and metrics, including collaboratively deciding to change the optimization problem after the set of proposals has been submitted.

In another aspect, the present invention comprises a computer-implemented method for collaborative selection of proposals by solving an optimization problem based on collaboratively selected attributes, requirements, and metrics, including preparing a request for proposal, providing a web site for submission of a plurality of proposals; iteratively, evaluating the plurality of proposals to yield a plurality of evaluations; and, distributing the plurality of evaluations, until at least one proposal is finalized to yield a candidate set of final proposals; iteratively, evaluating metrics for the candidate set of final proposals; optimizing the metrics to yield an optimized subset of proposals; distributing the optimized subset of proposals; reformulating the metrics; and, re-optimizing the optimized subset of proposals, until the metrics are finalized to yield a final optimized subset of proposals.

In a further aspect, the present invention comprises a computer system for selecting a subset of proposals from a set of proposals submitted via a web site including a server having an interface; a processor communicating with the interface over a first network segment; and, wherein the processor provides a proposal selection process, for collaboratively selecting a subset of proposals from a set of proposals submitted via a web site by solving an optimization problem based on collaboratively selected proposal attributes, requirements, and metrics, including collaboratively deciding to change the optimization problem after the set of proposals has been submitted, the process communicating with the interface over a second network segment.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, embodiments of the present invention provide a method and apparatus for selecting a subset of proposals from a set of proposals submitted via a web site, including, for example, selecting a subset of proposals for government funding of research contracts or selecting articles submitted for presentation at conferences. Exemplary embodiments of the present invention provide a method and apparatus that facilitate finding a subset of proposals that is best possible with respect to criteria formulated collaboratively, without the need for very long meetings or teleconferences, since most of the selection work may be done via web applications including solving optimization models.

Proposals may be submitted by filling out a web form that elicits the information about proposal attribute values and the text of the proposal itself. The present invention may assign proposals to evaluators who are asked to score them by attributes. The assignment may optionally be made by consulting persons who are familiar with the relevant technical areas. Evaluations may be first prepared independently by several evaluators for each proposal. Evaluations may be later distributed to other evaluators. Evaluators may revise their initial evaluations in view of others' evaluations. At the end of the evaluation process, each proposal has a consensus score for each of the attributes.

The problem of selecting a subset of proposals may be viewed as an optimization problem subject to constraints. Suppose the proposals are identified by numbers i=1, ..., n. Denote by $x_i$ a binary variable indicating whether or not proposal i is selected, i.e., $x_i=1$ means "selected" and $x_i=0$: means "not selected."

Suppose proposal i requires an investment of $a_i$. Then, the constraint that the total investment should not cost more than the total budget B may be formulated as $$a_1 x_1 + \ldots + a_n x_n \leq B.$$

If the total cost is not the simple sum of the chosen projects, then additional terms may be added to this constraint to reflect that. For example, if the cost of projects 1 and 2 together is $a_1 + a_2 - a_{12}$, then the term $-a_{12} x_1 x_2$ may be added. Suppose S $\subset \{1, \ldots, n\}$ is the subset of all the proposals in a certain technical area, and there is a requirement that the selected subset of proposals should not include more than $U_S$, but at least $L_S$, proposals from the set S. Then, this requirement may be formulated by the following inequalities:

$$L_S \leq \sum_{i \in S} x_i \leq U_S.$$

Other requirements may be expressed by inequalities similar to these or to the budget constraint formulated above. For yet another example, if proposal I requires $d_i$ full-time engineers and the total number of engineers should not exceed D, then this requirement may be formulated by:

$$d_1 x_1 + \ldots + d_n x_n \leq D.$$

The optimization formulation may include at least one optimization criterion (objective function), which may be similarly expressed. For example, if the objective is to maximize the total net profit, and the project of proposal i is expected to yield a net profit of $c_i$, then this objective may be formulated as $$\text{Maximize } c_1 x_1 + \ldots + c_n x_n.$$

Corrective terms may be inserted into this objective function if the profits from different projects are interrelated. For example, a term $c_{12} x_1 x_2$ can be subtracted if 1 and 2 together are expected to yield less than $c_1 + c_2$.

During the stage of formulating the optimization problem, parameters of the model may have to be identified in order to incorporate their estimated values e.g., (i) total cost not exceeding budget, (ii) total number of person-years not exceeding a certain upper bound, required for executing projects, (iii) expected profit from projects, (iv) parameters reflecting interrelations amongst projects, (v) parameters describing needs by geographic locations or technical areas.

Once the formulation of the optimization problem has been completed and the values of all the parameters have been estimated, the system can send the model to a software module that may solve the problem. Excel™ (currently available from Microsoft, Inc., WA US) is an example of a solver that can be used for this purpose. Other tools, such as CPLEX™ (currently available from ILOG, CA US), may be available for solving large problems.

The results of the optimization problem may be distributed on line to the selection team, and the present invention may also allow members of the team to try out on-line "what if" analyses with the model. Such analyses may include modifying numerical values prior to solving the optimization problem numerically. Examples of such parameters, mentioned above, are costs of projects and amounts of other resources available. The "what if" analyses may include eliminating constraints or changing any assumptions of the model.

Based on individual experiences with the model and reporting feedback to the system, the selection team may revise the model and re-solve it. This step can be carried out by proposing changes on line until no more changes are suggested.

Given the results of the revised model, an on-line discussion of the results leads to the final recommendation to the deciding authority. The recommendation may specify the selected subset together with the rationalization provided by the assumptions of the model, the estimated values of its parameters, the results, and some sensitivity-analysis output from the solver. The deciding authority may require modification of the model and resolving. This step too does not necessarily require meetings or teleconferences.

Figure 1:
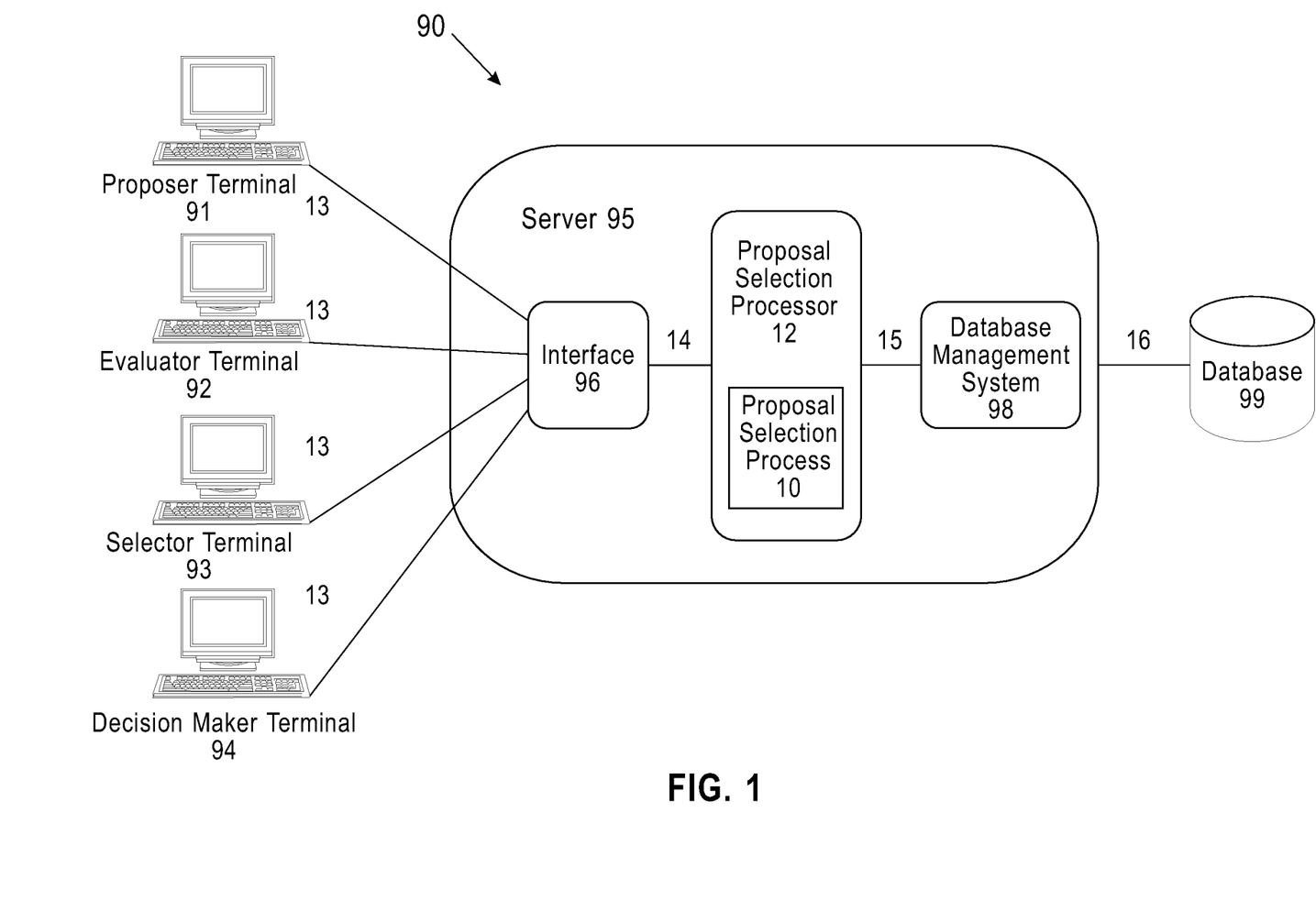
FIG. 1 is a block diagram illustrating a system for collaborative selection of proposals in accordance with an exemplary embodiment of the present invention.

Referring to the drawings, FIG. 1 is a system block diagram illustrating a system for collaborative selection of proposals in accordance with an exemplary embodiment of the present invention. A proposal selection system 90 may include at least one proposer terminal 91, at least one evaluator terminal 92, at least one selector terminal 93, at least one decision maker terminal 94, that communicate over a first plurality of network segments 13 with a server 95 having an interface 96 and at least one proposal selection processor 12. A proposal selection process 10 is implemented on the at least one proposal selection processor 12 which may communicate over a second network segment 14 with the interface 96 and over a third network segment 15 with a database management system 98. The database management system 98 may communicate over a fourth network segment 16 with at least one database 99.

The first, second, third, and fourth network segment may all be selected from the group consisting of electrical connection, optical connection, intranet, extranet, internet, and combinations thereof.

Figure 2:
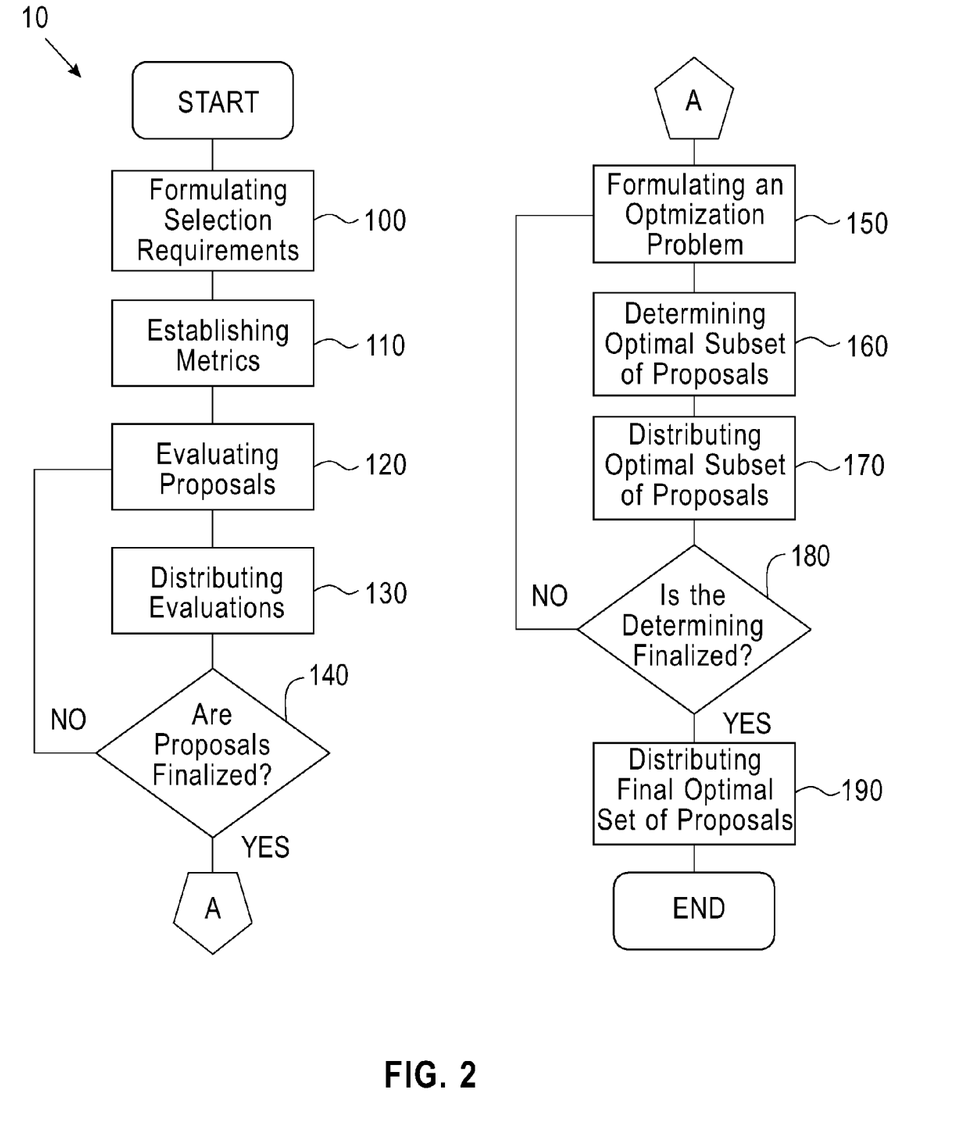
FIG. 2 is a flowchart illustrating a method of collaborative selection of proposals in accordance with an exemplary embodiment of the present invention.

FIG. 2 is a flowchart further illustrating the proposal selection process 10, which is a computer-implemented method of selecting a subset of proposals from a set of proposals submitted via a web site. The proposal selection process 10 includes formulating selection requirements 100 for the subset, establishing metrics 110 for comparing proposals according to proposal attributes and selection requirements; iteratively, evaluating each of the set of proposals 120 according to established metrics; distributing the evaluations 130 of each of the set of proposals to the submitter of each proposal, until at least one submitter decides that at least one proposal is finalized 140; iteratively, formulating an optimization problem 150 for determining an optimal subset of proposals; determining the optimal subset of proposals 160 by solving the optimization problem; distributing the optimal subset of proposals 170 to at least one member of a selection group, until the result of at least one member of the selection group decides that the determining is finalized 180; and distributing the final optimal set of proposals 190 to an authority for decision to purchase.

Figure 3:
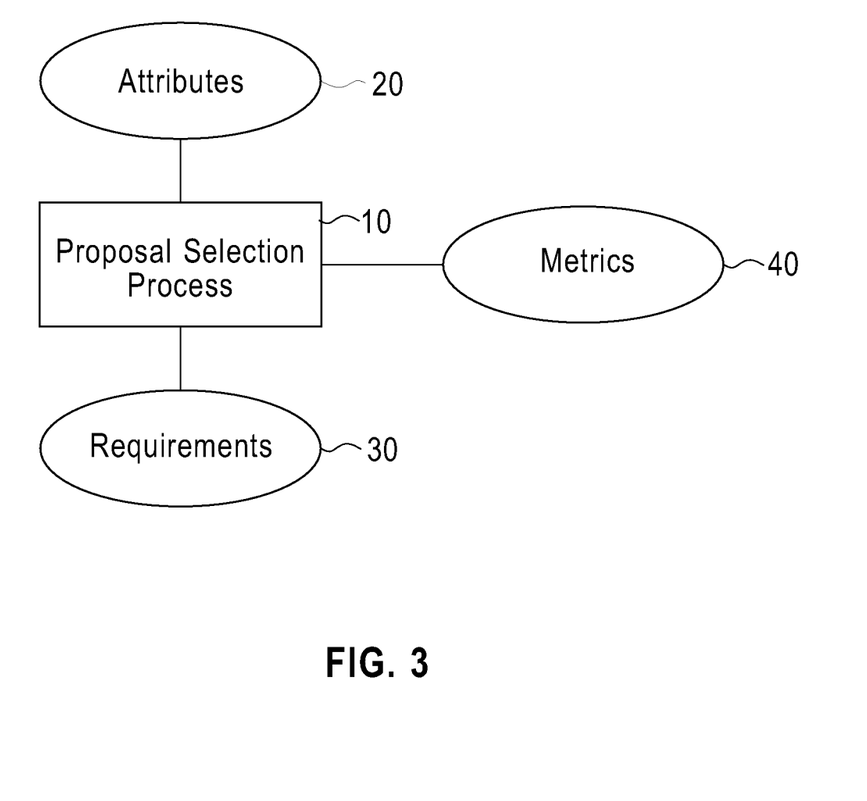
FIG. 3 is an entity-relationship diagram illustrating a proposal selection process and its information inputs in accordance with an exemplary embodiment of the present invention.

FIG. 3 is an entity-relationship diagram further illustrating how the proposal selection process 10 depends on information in accordance with an exemplary embodiment of the present invention. In particular, FIG. 3 depicts how the proposal selection process 10 depends on at least one attribute 20, at least one requirement 30, and at least one metric 40, as further described below.

Attributes help characterize proposals in various ways. An attribute can be numerical or categorical. Examples of numerical attributes are: number of person-years, investment required, duration of proposed project in months, and expected revenue. Examples of categorical attributes are: (i) technical areas of proposed project, (ii) existing competition, (iii) suitability for particular geographic areas, (iv) skills required, and (v) potential for long-term value. The web form on which attributes may be reported can elicit the information by asking the person to report a number, to choose an answer from a given list of possible answers, or simply to answer yes or no.

Requirements formulate constraints that the selected combination of proposals may satisfy. Examples of requirements are: (i) total cost not exceeding a predetermined budget, (ii) total number of person-years not exceeding a predetermined upper bound, iii) number of projects in a certain technical area not less than a predetermined lower bound, (iv) number of projects in a certain geographic area between about a predetermined lower bound and about a predetermined upper bound, (v) amount of particular skill resources required not exceeding a predetermined upper bound, and (vi) any total based on attribute values required to be between about a predetermined lower bound and a predetermined upper bound.

Metrics formulate objectives for comparing combinations of proposals whose attributes may satisfy the requirements formulated as constraints. Examples of metrics are: (i) total expected revenue, (ii) total number of new hires, (iii) total number of expected new clients, and (iv) expected growth in market share.

Figure 4:
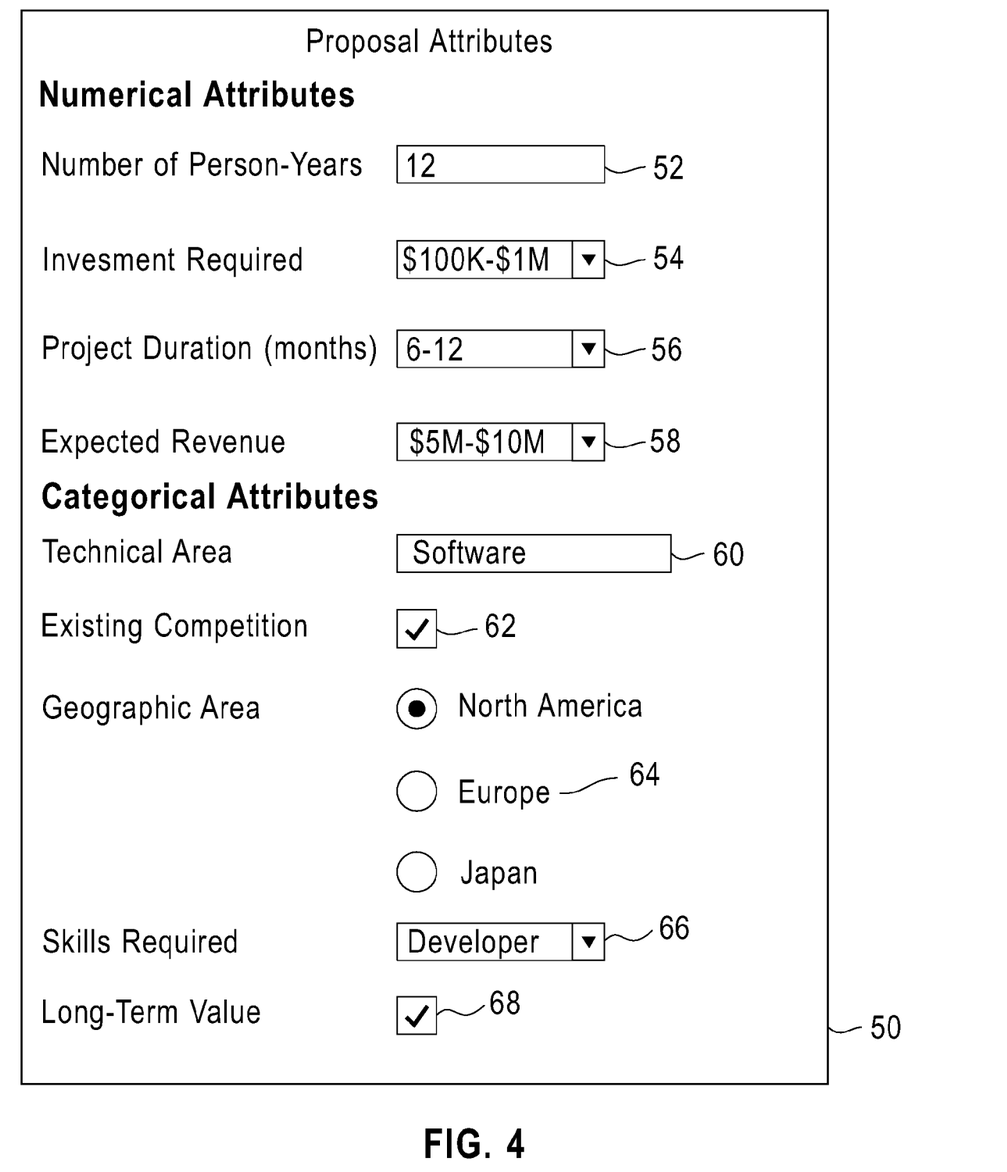
FIG. 4 depicts a web form illustrating input of proposal attributes according to a method of collaborative selection of proposals in accordance with another exemplary embodiment of the present invention.

FIG. 4 depicts a web form 50 illustrating input of proposal attributes according to an exemplary embodiment of the present invention. In particular, FIG. 4 depicts an exemplary web form that can elicit proposal attributes including numerical attributes such as number of person-years 52, investment required 54 selected from a list of values, project duration in months 56 selected from a list of values, and expected revenue 58 selected from a list of values. FIG. 4 also depicts categorical attributes, including technical area 60, presence or absence of existing competition 62 (selected by checking or clearing a check box), suitability for particular geographic areas 64 (selected from a group of radio buttons), skills required 66 (selected from a list), and potential for long-term value 68 such as positive return on investment over a five year horizon (selected by checking or clearing a check box).

Figure 5:
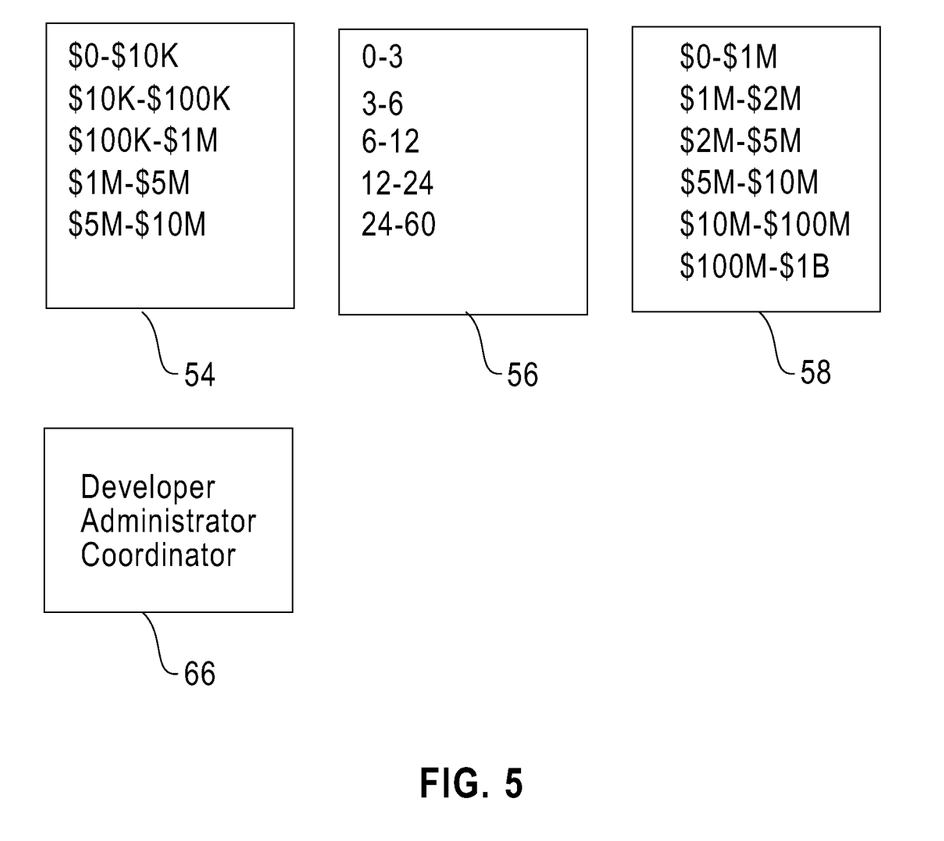
FIG. 5 depicts details from the web form of FIG. 4, illustrating input of proposal attributes according to a method of collaborative selection of proposals in accordance with an exemplary embodiment of the present invention.

FIG. 5 depicts exemplary details from the web form 50 of FIG. 4, illustrating input of proposal attributes according to a method of collaborative selection of proposals in accordance with an exemplary embodiment of the present invention. In particular, FIG. 5 shows the list of values of investment required 54 the list of values of project duration in months 56, the list of expected revenue 58, and the list of skills required 66.

Figure 6:
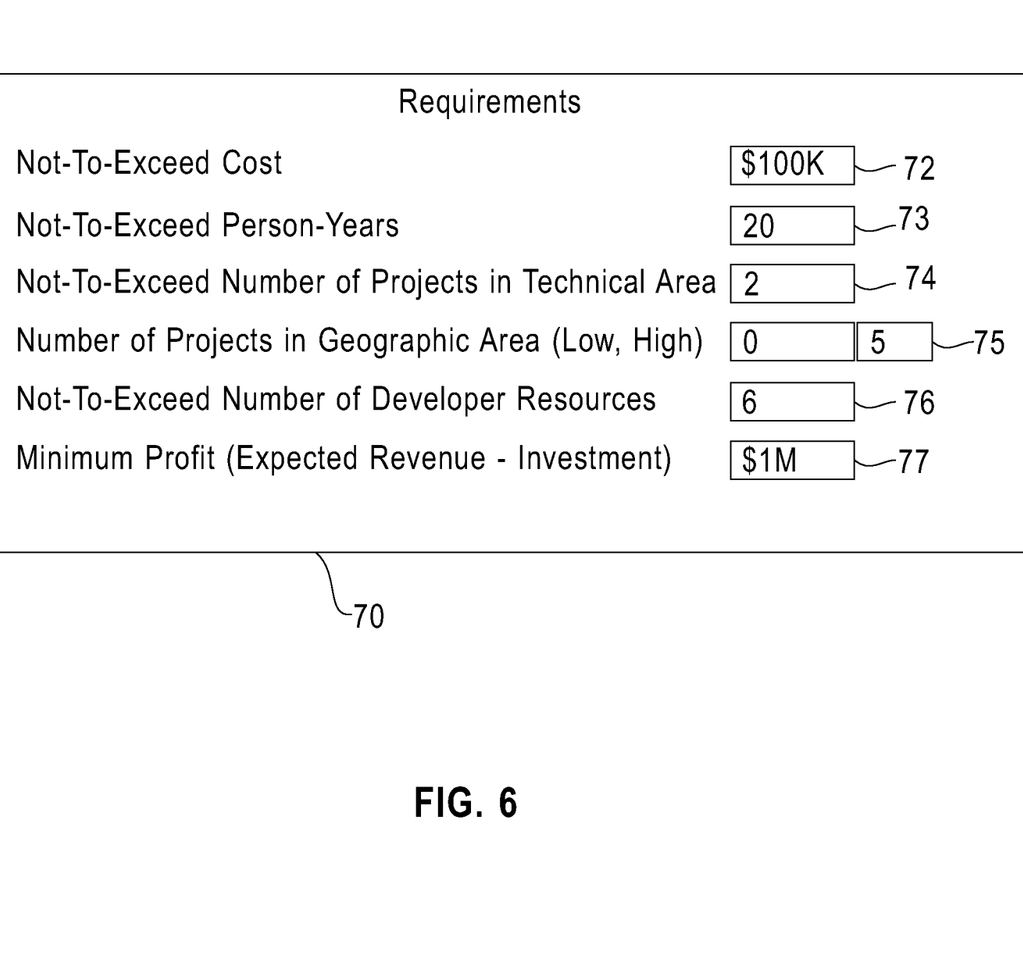
FIG. 6 depicts a web form illustrating input of proposal requirements according to a method of collaborative selection of proposals in accordance with a further exemplary embodiment of the present invention.

FIG. 6 depicts a web form 70 illustrating input of proposal requirements in accordance with an exemplary embodiment of the present invention. In particular, FIG. 6 depicts a not-to-exceed cost 72, a not-to-exceed number of person-years 73, a not-to-exceed number of projects in the technical area 74, a range of number of projects in a particular geographic area 75, a not-to-exceed number of developer resources 76, and a minimum acceptable profit (expected revenue—investment) 77.

Figure 7:
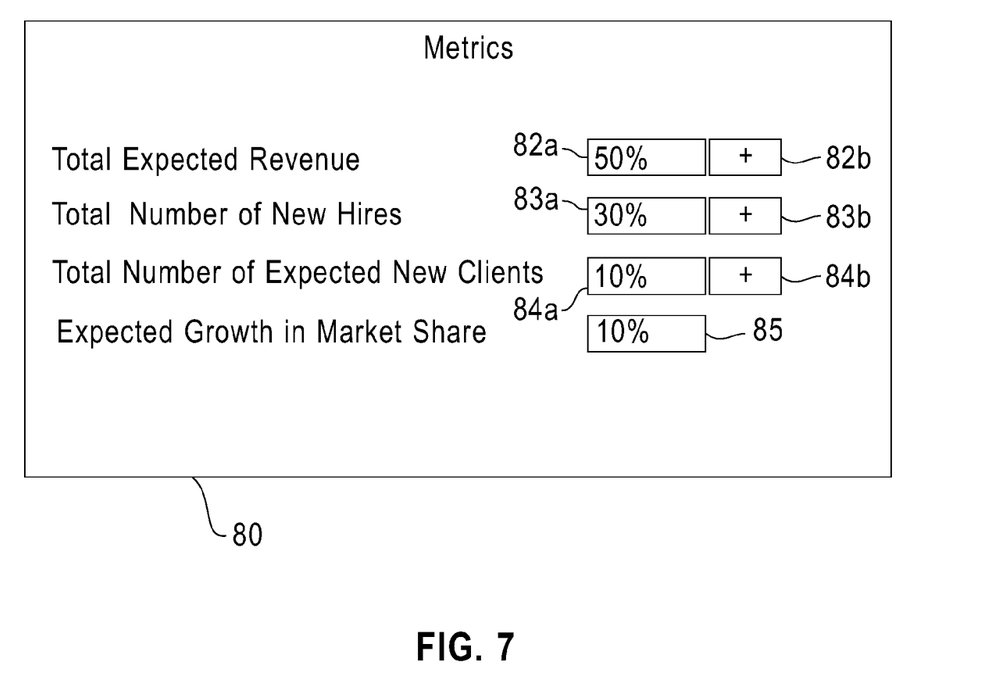
FIG. 7 depicts a web form illustrating input of proposal metrics according to a method of collaborative selection of proposals in accordance with a still further exemplary embodiment of the present invention.

FIG. 7 depicts a web form 80 illustrating input of proposal metrics in accordance with an exemplary embodiment of the present invention. In particular, FIG. 7 depicts the selection of a combination of metrics including weight accorded to total expected revenue at 82a, weight accorded to total number of new hires 83a, weight accorded to total number of expected new clients 84a, and weight accorded to expected growth in market share 85, combined with additive operations specified at 82b, 83b, and 84b.

In an exemplary embodiment of the present invention, FIGS. 4 and 5 illustrate how a particular evaluator may score a particular proposal according to a combination of numerical and categorical attributes. The web form 50 shows that the evaluator scored the proposal in terms of 12 person-years of work (entered in text box 52), investment in the range from about $100,000 to about $1,000,000 (selected from list 54), project duration 6-12 months (selected from list 56), expected revenue in the range from about $5,000,000 to about $10,000,000 (selected from list 58), the technical area is categorized as "Software" (entered into text box 60), there is existing competition (selected by checking check box 62), the proposal is suitable for the "North America", but not "Europe" or "Japan" geographic areas (selected from radio button group 64), the proposal requires "Developer" skills (selected from list 66), and the proposal has long-term value, such as expected positive return on investment over a five year horizon (selected by checking check box 68).

FIG. 5 illustrates the lists 54, 56, 58, and 66 in the above exemplary embodiment of the present invention. In particular, list 54 includes the following ranges of proposed investment: about $0 to about $10,000; about $10,000 to about $100,000; about $100,000 to about $1 million; about $1 million to about $5 million; about $5 million to about $10 million. List 56 includes the following ranges of proposed project duration in months: about zero to about three; about three to about six; about six to about twelve; about twelve to about twenty-four; and, about twenty-four to about sixty. List 58 includes the following ranges of expected return on investment: about $0 to about $1 million; about $1 million to about $2 million; about $2 million to about $5 million; about $5 million to about $10 million; about $10 million to about $100 million; and, about $100 million to about $1 billion. List 66 includes the following choice of skills: "Developer", "Administrator" and, "Coordinator."

In the above exemplary embodiment of the present invention, FIG. 6 illustrates the web form 70 specifying a set of requirements formulated collaboratively by at least one member of the selection group. In particular, a requirement that the total cost must not exceed about $100,000 for all selected combination of proposals is entered into text box 72; a requirement that the total number of person-years must not exceed 20 person-years for all selected combinations of proposals is entered into text box 73; a requirement that the total number of projects in the technical area must not exceed two for all selected combination of proposals is entered into text box 74; a requirement that the number of projects in the geographic area must not be less than zero and must not exceed five is entered into text box pair 75; a requirement that the total number of developer resources not exceed six for all selected combination of proposals; and, a minimum acceptable total profit (expected revenue—investment) for all selected combination of proposals must not be less than about $1,000,000 is entered into text box 77.

In the above exemplary embodiment of the present invention, FIG. 7 illustrates the web form 80 specifying a set of metrics formulated collaboratively by at least one member of the selection group. In particular, FIG. 7 illustrates that combinations of proposals are being compared with an additive weighted combination of the following metrics: total expected revenue with weight about 50% entered into text box 82a; total number of new hires with weight about 30% entered into text box 83a; total number of new clients with weight 10% entered into text box 84a; and, expected growth in market share with weight 10% entered into text box 85. The web form 80 specifies an additive combination of weights since a "plus" sign is entered into each of the text boxes 82b, 83b, and 84b, respectively. Hence, the optimization problem is formulated as maximizing the metric denoted by M, where $$M=0.5*(\text{total expected revenue})+0.3*(\text{total number of new hires})+0.1*(\text{total number of new clients})+0.1*(\text{expected growth in market share}).$$

It should be understood, of course, that the foregoing relates to exemplary embodiments of the invention and that modifications may be made without departing from the spirit and scope of the invention as set forth in the following claims.

I claim:

1. A method of collaboratively selecting a subset of proposals from a set of proposals submitted via a web site, comprising:
   storing the set of proposals on a non-transitory computer storage medium;
   solving an optimization problem using an optimization model by the performance of a computer processor based on collaboratively selected proposal attributes, requirements, and metrics, including collaboratively deciding to change the optimization problem after the set of proposals has been submitted,
   modifying the optimization model for optimizing the project proposals dynamically by a team over the internet;
   wherein the metrics include formulating objectives used to compare at least two first combined proposals with at least two second combined proposals whose attributes satisfy requirements formulated as constraints.

2. The method of claim 1, wherein the proposal attributes are numerical.

3. The method of claim 1, wherein the proposal attributes are categorical.

4. The method of claim 1, wherein the proposal attributes are at least one selected from the group consisting of a number of person-years, investment required, duration of proposed project, expected revenue, and combinations thereof.

5. The method of claim 1, wherein the proposal attributes are at least one selected from the group consisting of technical areas of a proposed project, presence of existing competition to the proposed project, suitability of the project for particular geographic areas, skills required for the proposed project, long-term value of the proposed project, and combinations thereof.

6. The method of claim 1, wherein the selection requirements are at least one selected from the group consisting of total cost not exceeding a predetermined budget, total number of person-years not exceeding a predetermined first value, number of projects in a predetermined technical area not less than a predetermined second value, number of projects in a predetermined geographic area between about a predetermined third value and about a predetermined fourth value, number of personnel having a specified skill not exceeding a fifth value, a total based on a combination of proposal attributes between about a predetermined sixth value and about a predetermined seventh value, and combinations thereof.

7. The method of claim 1, wherein the metrics are at least one selected from the group consisting of total expected revenue, total number of new hires, total number of expected new clients, expected growth in market share, and combinations thereof.

8. A computer-implemented method for collaborative selection of proposals by solving an optimization problem based on collaboratively selected attributes, requirements, and metrics, comprising:
   preparing a request for proposal;
   providing a web site for submission of a plurality of proposals;
   iteratively,
      evaluating the plurality of proposals using a computer processor to yield a plurality of evaluations; and,
      distributing the plurality of evaluations, until at least one of the plurality of proposals is finalized to yield a candidate set of final proposals;
   iteratively,
      evaluating metrics for the candidate set of final proposals;
      optimizing by the computer processor with a first combination of the metrics to yield an optimized subset of proposals, and an optimized model of the subset of proposals;
      performing sensitivity analysis on the optimized model for a subset of project proposals;
      distributing the optimized subset of proposals;
      reformulating the metrics by generating a second combination of the metrics; and, re-optimizing the optimized subset of proposals, until the metrics are finalized to yield a final optimized subset of proposals,
wherein the metrics include formulating objectives used to compare at least two first combined proposals with at least two second combined proposals whose attributes satisfy the requirements formulated as constraints.

9. The computer implemented method of claim 8, wherein:
the requirements include a predetermined lower bound on a weighted combination of scores of attributes;
each of the plurality of proposals is evaluated independently by several evaluators; and
the evaluations are revised by the evaluators after the evaluators review other evaluations prepared by other evaluators.

10. The computer implemented method of claim 8, wherein the requirements include a predetermined upper bound on a weighted combination of scores of attributes.

11. The computer-implemented method of claim 8, wherein the requirements include a predetermined lower bound on a weighted additive combination of scores of attributes.

12. The computer-implemented method of claim 8, wherein the requirements include a predetermined lower bound on a weighted multiplicative combination of scores of attributes.

13. The computer-implemented method of claim 8, wherein the requirements include predetermined upper bound on a weighted additive combination of scores of attributes.

14. The computer-implemented method of claim 8, wherein the requirements include a predetermined upper bound on a weighted multiplicative combination of scores of attributes.

15. The computer-implemented method of claim 8, wherein the requirements include a predetermined lower bound on a weighted combination of binary variables specifying the combination of selected proposals.

16. The computer-implemented method of claim 8, wherein the requirements include a predetermined upper bound on a weighted combination of binary variables specifying the combination of selected proposals.

17. The computer-implemented method of claim 8, wherein the metrics to be optimized are combinations of weighted values.

18. A computer system for selecting a subset of proposals from a set of proposals submitted via a web site comprising:
a server having an interface; and
a processor communicating with the interface over a first network segment,
wherein said processor provides a proposal selection process for collaboratively selecting a subset of proposals and generating an optimized model of the subset of proposals from a set of proposals submitted via a web site by solving an optimization problem based on collaboratively selected proposal attributes, requirements, and metrics, including collaboratively deciding to change the optimization problem after the set of proposals has been submitted, said process including communicating with the interface over a second network segment,
wherein the metrics include formulating objectives used to compare at least two first combined proposals with at least two second combined proposals whose attributes satisfy requirements formulated as constraints.

19. The computer system of claim 18, including:
a database management system configured for communicating with the processor over a third network segment and with a database over a fourth network segment;
a proposal terminal configured for sending proposals to the website;
an evaluator terminal configured for sending evaluations of proposals to the website;
a selector terminal configured for sending a selection of one or more of the proposals to the website; and
a decision maker terminal configured for sending decisions regarding the proposal selection process to the website.

20. The computer system of claim 18, wherein the first network segment and second network segment are both selected from the group consisting of electrical connection, optical connection, intranet, extranet, internet, and combinations thereof.

* * * * *